US012451114B2

(12) United States Patent
Pavlovsky et al.

(10) Patent No.: US 12,451,114 B2
(45) Date of Patent: Oct. 21, 2025

(54) TECHNIQUES FOR SECURELY SYNTHESIZING SPEECH WITH THE NATURAL VOICE OF A SPEAKER DURING A LANGUAGE-TRANSLATED COMMUNICATION SESSION

(71) Applicant: Microsoft Technology Licensing, LLC, Redmond, WA (US)

(72) Inventors: Jan Pavlovsky, Prague (CZ); Adam Czeisler, Seattle, WA (US); Luis Carrasco, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 18/077,934

(22) Filed: Dec. 8, 2022

(65) Prior Publication Data

US 2024/0194177 A1    Jun. 13, 2024

Related U.S. Application Data

(60) Provisional application No. 63/429,736, filed on Dec. 2, 2022.

(51) Int. Cl.
*G10L 13/02* (2013.01)
*G06F 40/40* (2020.01)
*G10L 13/08* (2013.01)

(52) U.S. Cl.
CPC .............. *G10L 13/02* (2013.01); *G06F 40/40* (2020.01); *G10L 13/086* (2013.01)

(58) Field of Classification Search
CPC ....... G10L 13/02; G10L 13/08; G10L 13/033; G10L 15/16; G06F 40/40; G06F 40/58;
(Continued)

(56) References Cited

U.S. PATENT DOCUMENTS 9,614,969 B2   4/2017   Aue et al.
10,200,381 B2 * 2/2019   Hunt .................. G06F 21/645
(Continued)

FOREIGN PATENT DOCUMENTS

CA    3160254 A1 * 11/2022 .......... G06F 40/166
CN    112637543 A    4/2021
(Continued)

OTHER PUBLICATIONS

International Search Report and Written Opinion received for PCT Application No. PCT/US2023/035555, Feb. 2, 2024, 12 pages.
(Continued)

*Primary Examiner* — Bhavesh M Mehta
*Assistant Examiner* — Carl R Poirier
(74) *Attorney, Agent, or Firm* — Schwegman Lundberg & Woessner, P.A.

(57) ABSTRACT

Described herein is a technique for securely synthesizing a voice of a speaker during a language translated voice call. When a voice call is first initiated between the speaker and one or more other call participants, the audio data representing the speech of the speaker is received at a server computer where it is processed by obtaining a sample of a fixed duration (e.g., 8 seconds). This fixed-duration sample is then processed to generate a voice profile of the speaker for use in generating synthesized speech in a voice of the speaker, in a second language. This process of sampling the audio data and generating the voice profile is repeated at a fixed interval (e.g., every 30 seconds), such that the voice profile of the speaker is continuously updated during the voice call.

20 Claims, 6 Drawing Sheets

(58) Field of Classification Search
CPC ...... G06F 21/31; G06F 21/645; G06F 40/166; H04L 65/765
See application file for complete search history.

(56) References Cited

U.S. PATENT DOCUMENTS

| | | | |
|---|---|---|---|
| 10,810,993 | B2 | 10/2020 | Chen et al. |
| 10,891,446 | B2 | 1/2021 | Hodge |
| 2013/0251119 | A1 | 9/2013 | Akolkar et al. |
| 2015/0347399 | A1 | 12/2015 | Greborio et al. |
| 2016/0234204 | A1* | 8/2016 | Rishi ...................... G06F 21/31 |
| 2019/0171715 | A1 | 6/2019 | Hodge |
| 2020/0169591 | A1 | 5/2020 | Ingel et al. |
| 2021/0089726 | A1 | 3/2021 | Yao |
| 2021/0279427 | A1* | 9/2021 | Malik ...................... G10L 25/51 |
| 2021/0304774 | A1 | 9/2021 | Srinivasan et al. |
| 2021/0400101 | A1* | 12/2021 | Ingel ...................... H04L 65/765 |

FOREIGN PATENT DOCUMENTS

| | | | |
|---|---|---|---|
| CN | 112652309 A | 4/2021 | |
| EP | 4095739 A1 * | 11/2022 | ........... G06F 40/166 |

OTHER PUBLICATIONS

Davies, Chris, "The Snapdragon 865's most interesting tech is something you'll forget is there", Retrieved From: https://www.slashgear.com/qualcomm-snapdragon-865-most-interesting-tech-hexagon-ai-processor-04602291, Dec. 4, 2019, 13 Pages.

Hao, Karen, "Google's AI can now translate your speech while keeping your voice", Retrieved From: https://www.technologyreview.com/2019/05/20/103054/google-ai-language-translation/, May 20, 2019, 8 Pages.

Jia, et al., "Direct speech-to-speech translation with a sequence-to-sequence model", Retrieved From: arXiv:1904.06037v2, Jun. 25, 2019, 5 Pages.

Jia, et al., "Introducing Translatotron: An End-to-End Speech-to-Speech Translation Model", Retrieved From: https://ai.googleblog.com/2019/05/introducing-translatotron-end-to-end.html, May 15, 2019, 5 Pages.

International Preliminary Report on Patentability received for PCT Application No. PCT/US23/035555, mailed on Jun. 12, 2025, 07 pages.

* cited by examiner

TECHNIQUES FOR SECURELY SYNTHESIZING SPEECH WITH THE NATURAL VOICE OF A SPEAKER DURING A LANGUAGE-TRANSLATED COMMUNICATION SESSION

RELATED APPLICATIONS

This application claims the benefit of U.S. Provisional Patent Application No. 63/429,736, filed Dec. 2, 2022, which is incorporated by reference herein in its entirety.

TECHNICAL FIELD

The present application generally relates to a technique for securely synthesizing the natural voice of a speaker when translating speech of the speaker from a first language to a second language during a real-time communication session, such as a one-to-one voice call, an audio or video-based conference, or similar online event. More specifically, the present application describes a technique for creating, and then continuously recreating, a voice profile of the speaker over the duration of the communication session, thereby diminishing opportunities for impersonating another person with deepfake voice cloning.

BACKGROUND

The use of artificial intelligence with language translation and speech synthesis technologies has made it possible to translate speech, in near real-time, from a first language to a second language with high accuracy and minimal processing delay. Language translation and speech synthesis technologies have been deployed with a variety of applications and for a variety of different use cases. For example, some personal communication applications use these technologies to enable voice calls and video calls between two or more call participants who natively speak different languages. By way of example, during a voice call that leverages these technologies, a first person who natively speaks a first language (e.g., English) may carry on a conversation with a second person who natively speaks a second language (e.g., French). Similarly, many audio and video-based conferencing applications use these technologies to allow one-to-many broadcasts, where a presenter speaks in a language that may be different from the language understood by other conference participants. By way of example, applications that facilitate broadcasting events—such as conferencing applications—may leverage these technologies to translate the speech of a presenter from a first language into synthesized speech in one or more alternative languages, appropriate for other conference participants.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for securely synthesizing a natural voice of a speaker when translating speech of the speaker from a first language to a second language, as may occur for example, during a voice call, audio or video-based conference call, or similar online event. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Technical advancements in speech synthesis have made it possible to generate synthesized speech with audible characteristics that mimic the natural voice of a person—a concept frequently referred to as voice cloning. Many conventional techniques that use voice cloning when synthesizing speech involve generating what is referred to herein as a voice profile. The term "voice profile" refers to voice data that encapsulates unique vocal characteristics of a real person, and which can be used by a speech synthesizer to generate synthesized speech having audible characteristics consistent with the natural or real voice of a speaker. For instance, when a speech synthesizer is generating synthesized speech, a voice profile is used as input to the speech synthesizer to produce synthesized speech that mimics the voice of the person with whom the voice profile is associated. As such, a voice profile may be thought of as a digital copy of a person's natural voice.

With many conventional communication applications and services that provide a language translation service using speech synthesizers, a voice profile for a person is created by prompting the person to speak and then capturing an audio recording of that person's speech. For example, the speaker may be prompted to read back a specific sentence or arrangement of words. The captured audio recording is then processed to identify vocal characteristics unique to that person, which are then stored in a voice profile for that person. When the person initiates a voice call or other communication session using the communication application, the voice profile of the person is retrieved from storage and used as an input by the speech synthesizer when creating language-translated synthesized speech during a real-time communication session—for example, a voice call or conferencing event.

The technique described immediately above is inherently risky due to the voice profile being stored by the communication application or service. For instance, if the voice profile inadvertently becomes accessible to others, the voice profile could be used for nefarious activities. For example, if a fraudster gains access to the voice profile, the fraudster could use the voice profile of another person to deceive others by pretending to be the person to whom the voice profile belongs. Because the synthesized speech that is generated using the voice profile would sound to others as if it was being spoken in real-time or near real-time by a known and trusted person, the targeted participants may trust the message of the fraudster and take some action that is against his or her own best interests. These types of illicit activities or schemes—generally referred to as deepfakes—have garnered widespread attention for their potential use in creating fake news, hoaxes, bullying, and financial fraud.

More recently, communication applications and services have addressed the problem set forth above by developing systems to capture a voice recording of a speaker and generate a voice profile for the speaker "on the fly" or in real-time, for example, by sampling the speech of the speaker during the beginning of a communication session. For example, when a communication session is initiated and a participant first speaks, the system detects the speech and captures a fixed-length sample of the speech from which a voice profile is generated. Then, for the remainder of the communication session, the voice profile is used when generating language-translated synthetic speech in a natural voice of the speaker. Accordingly, when the voice profile is created during the actual communication session for which the voice profile will be used, the voice profile for the speaker need not be stored by the communication application or service. The voice profile that is derived for the speaker during the beginning of the communication session is used throughout the duration of the communication session to generate synthesized speech in the speaker's natural voice.

However, this technique of using a voice profile to generate synthesized speech is still susceptible to deepfake schemes. For example, if a fraudster has previously captured a recording of another person, the fraudster could play back the recording of the speech (and voice) of that person at the beginning of a communication session. The voice profile service of the system would then create, for the benefit of the fraudster, a voice profile having vocal characteristics of the other person, thereby allowing the fraudster to impersonate the other person throughout the remainder of the communication session. For example, after initially playing back the recording of the other person at the beginning of the communication session, the fraudster would then be able to speak in his or her own voice, while the language-translated synthesized speech would be generated with the voice profile of the other person, allowing the fraudster to impersonate the other person.

Consistent with embodiments of the present invention, a communication application or service has a voice profile service that generates and refreshes a voice profile for a speaker at a regular interval throughout the duration of a communication session. By way of example, when a communication session is first initiated and a first participant of the communication session begins speaking, a fixed-length (e.g., 8 second) sample of the audio data representing the speech of the first participant is processed by the voice profile service to generate a voice profile for the first participant. Then, at some regular interval (e.g., every 30 seconds), the voice profile service will again sample the speech of the first participant to generate a refreshed or updated voice profile. In some instances, as an updated voice profile is generated, the updated voice profile is written to a volatile memory storage device such that it overwrites the previously generated voice profile. This process continues for the duration of the communication session. By iteratively refreshing or updating the voice profile of each participant in the communication session, the risk of deepfake schemes, where one person leverages the voice profile of another person to achieve some fraudulent objective, is significantly reduced. For instance, if a fraudster begins a call by playing back a recording of another person's speech, the initial voice profile generated for use in synthesizing the translated speech will be in the voice of the other person. However, when a subsequent voice profile is generated, the subsequent voice profile will be based on the speech of the fraudster, and as such, other participants in the communication session will observe a significant change in the voice of the synthesized speech. Indeed, the changing of the voice will also be a signal to participants that some nefarious activity may be occurring. Other aspects and advantages of the present invention will be readily apparent from the description of the several figures that follows. The disclosed technical solutions of resampling the speech of the first participant (e.g., a speaker) to generate a refreshed or updated voice profile thus solves the technical problem of preventing abuse of previously generated voice profiles.

Figure 1:
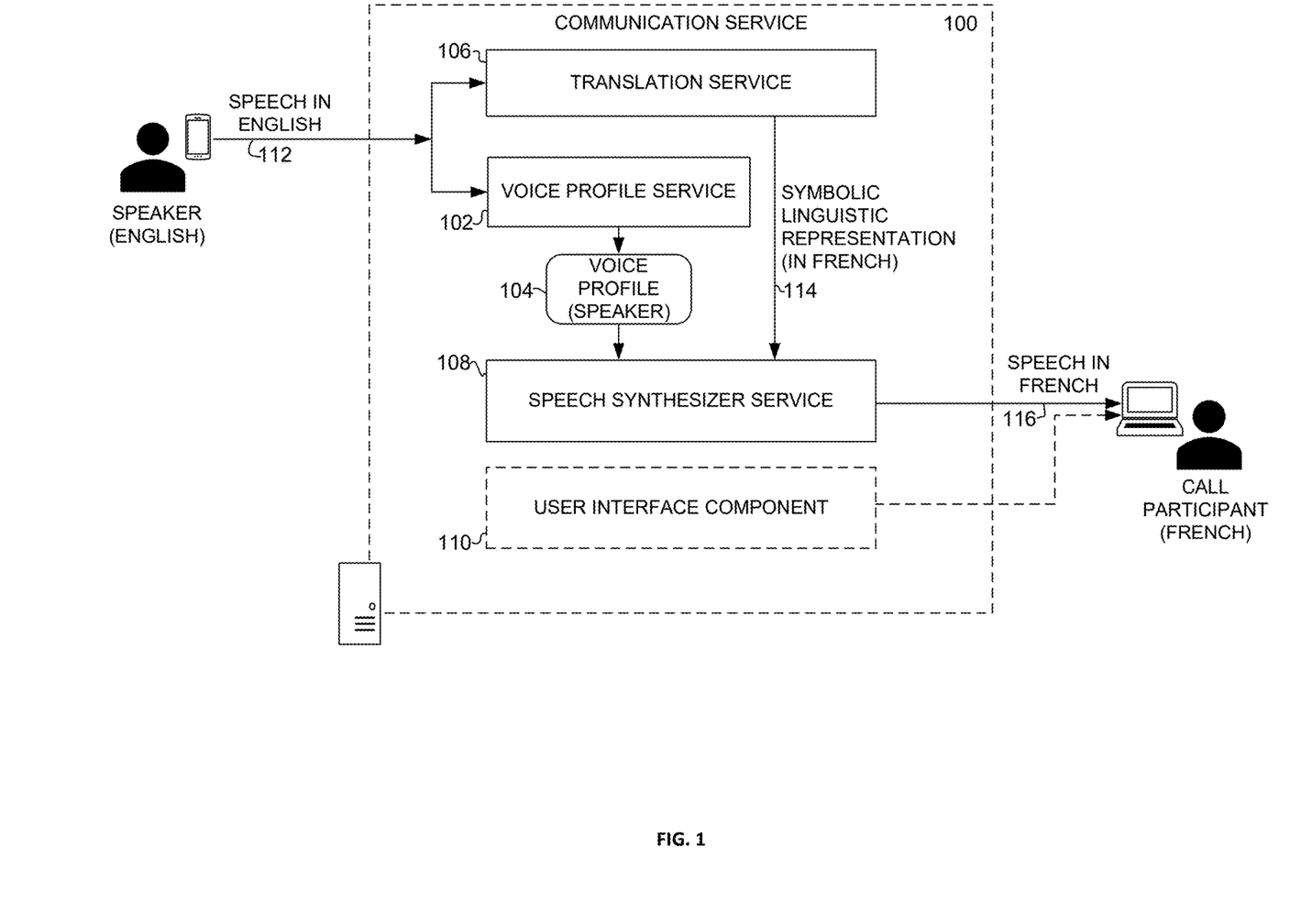
FIG. 1 is a diagram illustrating an example of an application having a voice profile service for continuously updating a voice profile of a speaker when generating language-translated synthesized speech, consistent with some embodiments.

FIG. 1 is a diagram illustrating an example of a communication service 100 having a voice profile service 102 for continuously updating a voice profile 104 of a speaker when generating language-translated synthesized speech 116, consistent with some embodiments. The communication service 100 may facilitate one-to-one voice calls or voice calls with more than two call participants, such as the case may be with an audio-conferencing or video-conferencing application. In other instances, the communication service 100 may facilitate one-to-many broadcast-like events, such as online conferences or online seminars—sometimes referred to as webinars—where one or more dedicated presenters (e.g., speakers) may present to a large audience of participants. Accordingly, with some embodiments, the communication service 100 may facilitate the communication of both audio and visual information, including video-based conferencing and web-based data presentation. However, in other instances, the communication service 100 may be a purely audio-based service. Furthermore, the techniques described herein may be implemented with communications services that are natively digital—for example, such as voice-over IP (VOIP) systems, Integrated Services Digital Network (ISDN) or other proprietary digital-based systems, but also analog-based systems, such as plain old telephone services (POTS).

As shown in FIG. 1, in addition to the voice profile service 102, the communication service 100 includes a translation service 106 and a speech synthesizer service 108. When a communication session is first initiated, speech 112, in a first language of a first speaker, is received at the communication service 100 and processed in parallel by the translation service 106 and the voice profile service 102. Although shown in FIG. 1 as separate services, with some embodiments, the voice profile service 102 may be a sub-component of the translation service 106. In any case, the translation service 106 processes the received audio data, representing the speech 112 of the speaker, by translating the speech from a first language to a second language, while simultaneously, the voice profile service processes a fixed-length sample of the audio data to derive a first voice profile for the speaker.

Translating the received speech 112 from a first language to a second language is generally achieved in two steps. The translation service 106 first processes the audio data representing the received speech 112 to recognize the component parts of the speech in a first language. Next, these recognized component parts of speech in the first language are translated or converted to component parts of speech in the second language. In various embodiments, the component parts of speech may take different forms—what are referred to as symbolic linguistic representations. For instance, with some embodiments, the component parts of speech may be text (e.g., words). However, in other embodiments, the component parts of speech may be phonetic transcriptions—symbols providing a visual representation of speech sounds (or phones). In either case, after performing speech recognition to identify or recognize the component parts of the speech, the recognized speech is then converted or translated to component parts of speech in the second (target) language. The output of the translation service 106 is thus a symbolic linguistic representation of the recognized speech 114, in the target or translated language.

While the translation service 106 is translating the speech received from the speaker, the voice profile service 102 obtains and processes a fixed-length sample of audio data, representing the speech 112, to generate a voice profile 104 for the speaker. Specifically, the voice profile service processes the fixed-length sample of audio data representing the speech from the speaker to identify various vocal characteristics. These vocal characteristics are then used in generating the voice profile 104 of the speaker. As shown in FIG. 1, the voice profile of the speaker is an input to the speech synthesizer service 108, which generates the synthesized speech 116, in the target or translated language, using the voice profile 104 as input to give the synthesized speech the audible characteristics of the natural voice of the speaker.

Figure 2:
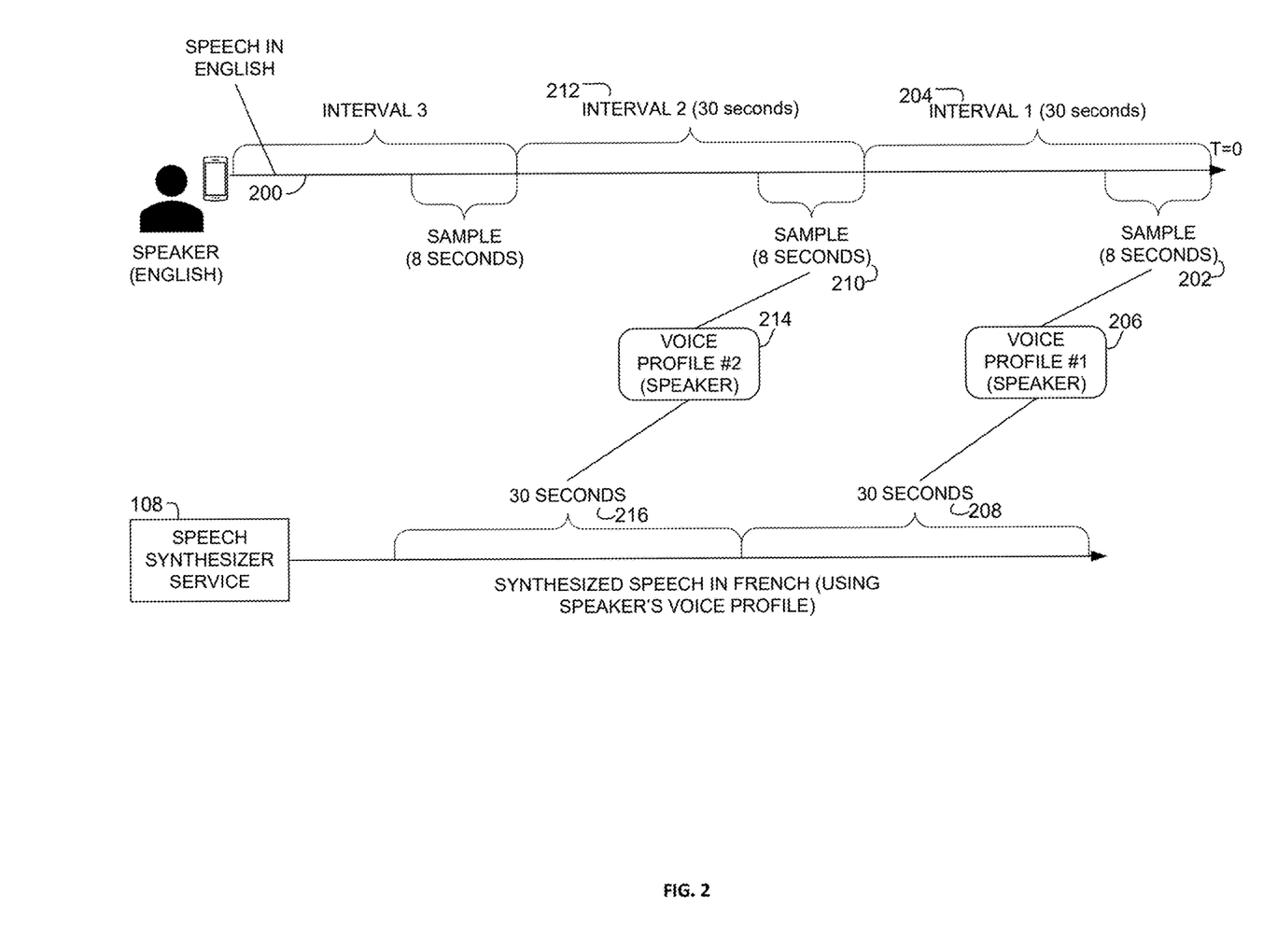
FIG. 2 is a diagram illustrating a timing diagram for a system that uses a voice profile service such as that described in FIG. 1, consistent with embodiments of the invention.

Referring now to FIG. 2, a timing diagram is shown to illustrate how the process set forth above is iteratively performed at a fixed interval, so that a voice profile is continuously refreshed or updated as a speaker continuously speaks during a communication session. As illustrated in FIG. 2, the line with reference number 200 represents a timeline during which the speaker is speaking in a first language (e.g., English). The point in the timeline designated as "T=0" represents the beginning of the communication session and thus the time at which the speaker begins speaking in English. As shown with reference number 202, an eight second sample of audio data representing the first eight seconds of speech from a first thirty second interval 204, is processed to generate a first voice profile 206 for the speaker (e.g., "VOICE PROFILE #1"). This first voice profile 206 is then used by the speech synthesizer service 108 to generate a portion of the synthesized speech 208 in the target or translated language (e.g., French), giving the synthesized speech audible characteristics consistent with the natural voice of the speaker.

As the speaker continues to speak, a second eight second sample of audio data 210 is captured during a second interval 212 and processed by the voice profile service to generate a second instance of the voice profile 214 of the speaker. The new voice profile 214 of the speaker is then utilized as an input to the speech synthesizer service 108 to generate a second portion of the synthesized speech 216, giving the synthesized speech audible characteristics consistent with the natural voice of the speaker. This process is continued for the duration of the communication session making it extremely difficult, if not impossible, for a fraudster to trick the system by playing a recording of another person's speech.

Although each interval is shown in FIG. 2 as being thirty seconds in length, in various alternative embodiments the fixed interval may be different lengths, for example, such as between ten to forty seconds in length. Similarly, the sample of audio data from which the voice profile is generated is illustrated in FIG. 2 as being eight seconds. However, in alternative embodiments, the length of the sample may be more or less than eight seconds, such as between two and ten seconds. Furthermore, in the timing diagram of FIG. 2, the sample of audio data that is obtained during the fixed interval, and from which the voice profile is derived, is shown as being obtained from the first portion (e.g., the first 8 seconds) of the fixed interval (e.g., 30) seconds of audio data). However, with some embodiments, the audio data from the entire fixed interval is first processed, and the sample is obtained from the portion (e.g., 8 seconds) of audio data having the best energy (e.g., most significant voice characteristics). By selecting the portion of the audio data obtained during the fixed interval having the best energy, the quality of the resulting voice profile is improved, and the situation where an audio sample has only silence or poor audio characteristics is avoided.

Referring again to FIG. 1, consistent with some embodiments, each time a voice profile is generated for a speaker, the new or updated voice profile for that speaker may be written to a volatile memory storage device by overwriting a previously generated voice profile for that speaker, thereby ensuring, for the sake of security, that no more than one profile is temporarily stored in volatile memory at any one time. Similarly, with some embodiments, upon detecting that a participant has terminated his or her participation in the communication session, the voice profile of that participant will be removed or deleted from memory. When a communication session ends, any voice profile that was generated for a participant in the communication session is deleted.

Consistent with some embodiments of the invention, the communication service 100 may facilitate the presentation of visual information within a user interface of an end-user's computing device via which that end-user establishes a communication session. Accordingly, as illustrated in FIG. 1 by the dashed-line box with reference number 110, with some embodiments, an optional user interface component 110 may be part of the communication service.

Figure 3:
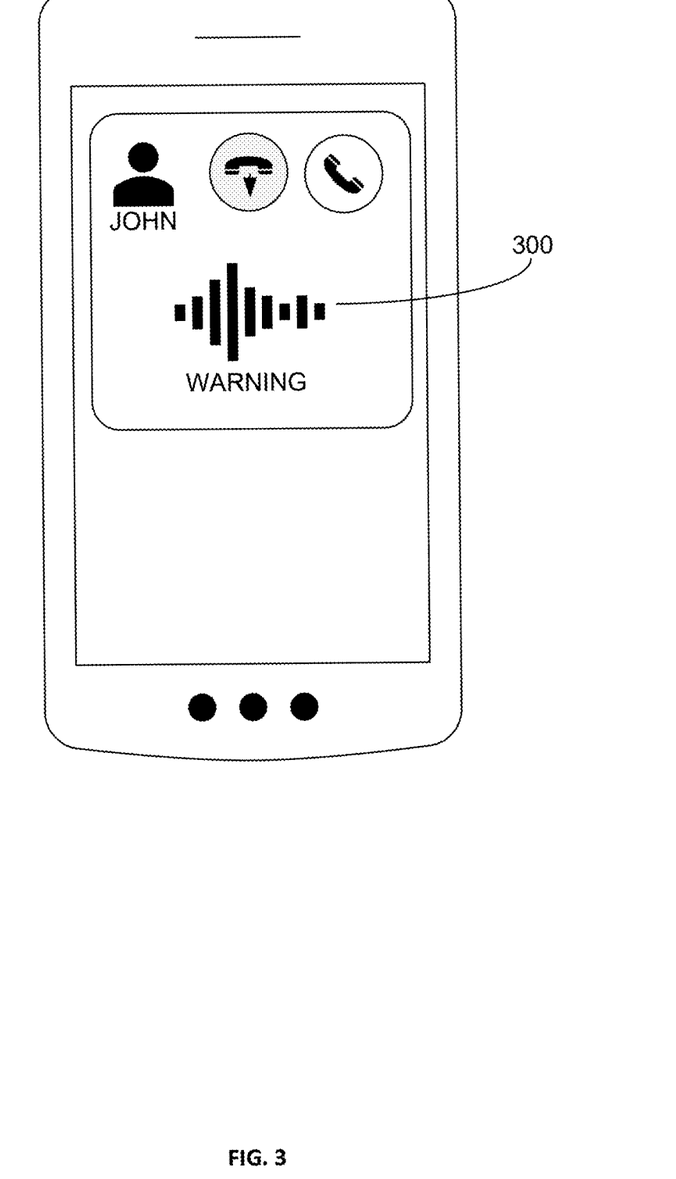
FIG. 3 is a user interface diagram illustrating an example of a user interface for an application that facilitates generating a visual notification when a significant change is detected to a voice profile of a speaker used to generate synthesized speech during a communication session, consistent with embodiments of the present invention.

Consistent with some embodiments, the user interface component 110 may generate a visual indicator for presentation via a user interface presented on the display of a device of a participant, where the visual indicator serves as a warning that an updated voice profile for a particular speaker has changed significantly from a previously generated voice profile for the same speaker. For example, with some embodiments, the voice profile service may include a voice profile verification component or service (not shown in FIG. 1). During a communication session, when the voice profile service 102 generates a voice profile for a speaker, before overwriting a previously generated voice profile for the speaker, the voice profile verification component may analyze the new voice profile to determine whether the new voice profile is different from the previously generated voice profile in some significant way. When the determined difference between some aspect of the new and old voice profiles exceeds a predetermined threshold, the voice profile verification service may cause the user interface component 110 to generate a visual indicator for presentation via a user interface shown on a display of a device of a participant. The visual indicator will serve as a warning to the participant that the speaker's voice profile has changed significantly, indicating a possibility of an impersonator. The icon and "warning" label with reference number 300 in FIG. 3 is an example of a visual indicator that may be presented to a participant of a communication session when a significant change has been detected in the successively generated voice profiles of a speaker.

Figure 4:
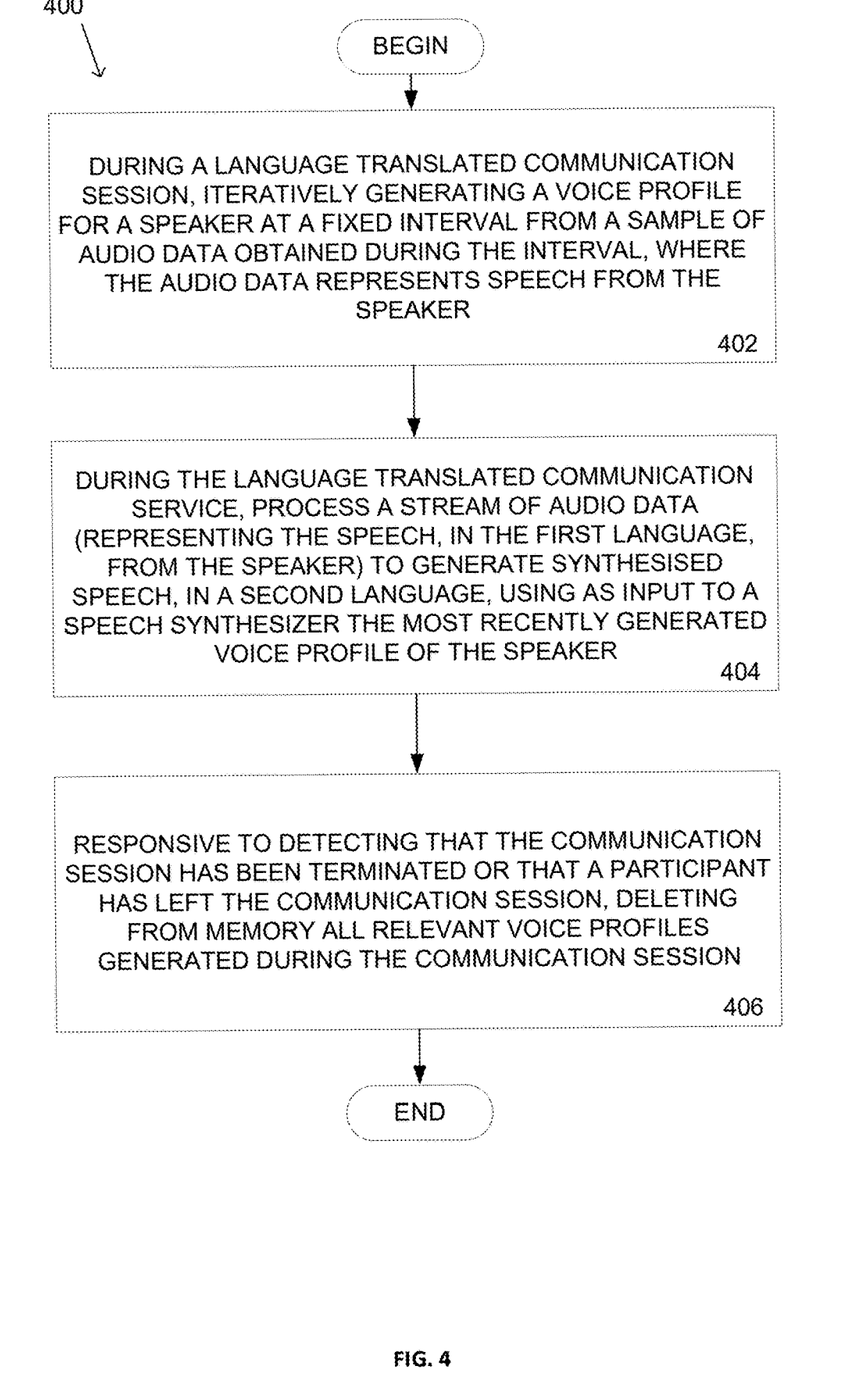
FIG. 4 is a flow diagram illustrating an example of a technique for translating speech from a first language to a second language, where the synthesized speech in the second language has audible characteristics of the natural voice of the speaker, consistent with embodiments of the invention.

FIG. 4 is a flow diagram illustrating an example of a technique (e.g., a method 400) for translating speech, received from the device of a speaker, from a first language to a second language, and then generating synthesized speech for communication to another participant, where the synthesized speech is in the second language with audible characteristics of the natural voice of the speaker, consistent with embodiments of the invention. At method operation 402, during a real-time, language-translated communication session for which the speech of a first participant (e.g., a speaker) is to be translated from a first language to a second language, and then played back as synthesized speech in the second language, a fixed-length sample of audio data, representing the speech of the speaker in the first language, is obtained. The sample of audio data is processed by a voice profile service to generate a voice profile for the speaker. The generating of the voice profile by the voice profile service is iteratively performed at a regular interval using audio data captured within the relevant interval. For example, with some embodiments, the interval length may be thirty seconds. Accordingly. every thirty seconds, the voice profile service obtains a fixed-length sample of audio data, representing the speech of the speaker, and uses the sample to generate a voice profile for the speaker. With some embodiments, as each new or updated voice profile is generated, the new or updated voice profile is written to the same space in memory as the previously generated voice profile, such that the new or updated voice profile overwrites the previously generated voice profile for the speaker. In this context, overwriting one voice profile with another may involve directly overwriting the voice profile—that is, writing the new voice profile to the same memory address as the previous voice profile, without first deleting or removing from memory the existing voice profile. Alternatively, overwriting the existing voice profile may involve first deleting or removing from memory the existing voice profile—to ensure that the existing voice profile is no longer available in the application domain—before writing to memory the new voice profile.

At method operation 404, simultaneously—that is, during the language-translated communication session—the speech of the speaker is translated to generate text or a phonetic transcription in a second language. For example, a speech translation service processes the speech as received from the device of the speaker and generates as output a symbolic linguistic representation of the recognized speech. This representation may be text or alternatively, phonetic transcription. In either case, the output of the translation service is provided as input to a speech synthesizer. The speech synthesizer uses the voice profile currently stored in memory—that is, the most recently generated voice profile that has been written to memory—to generate synthesized speech based on the output of the translation service, such that the synthesized speech is based on the speech of the speaker, is in a second language, and has audible characteristics that are consistent with the natural voice of the speaker associated with the voice profile used in generating the synthesized speech.

Finally, at method operation 406, when the communication session ends, or when one or more participants exit or leave the communication session, any or all relevant voice profiles that were generated during the communication session are deleted from memory or are otherwise made inaccessible.

By continuously and iteratively generating a voice profile of a speaker during a communication session, a person with bad intentions cannot easily use a recording of another person's speech to generate a voice profile based on the voice of that other person, and thus impersonate that person during a communication session.

Machine and Software Architecture

Figure 5:
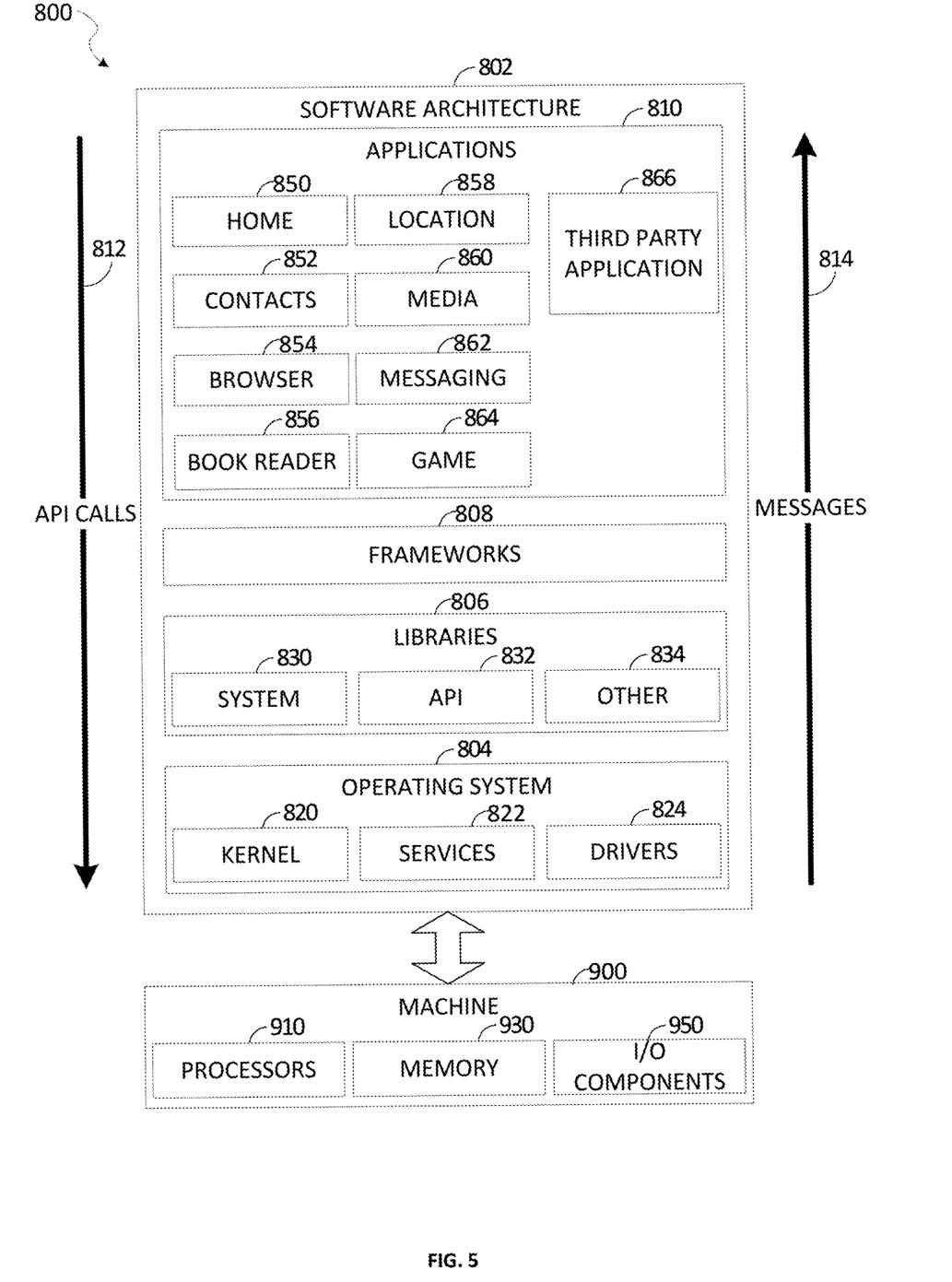
FIG. 5 is a block diagram illustrating a software architecture, which can be installed on any of a variety of computing devices to perform methods consistent with those described herein.
Figure 6:
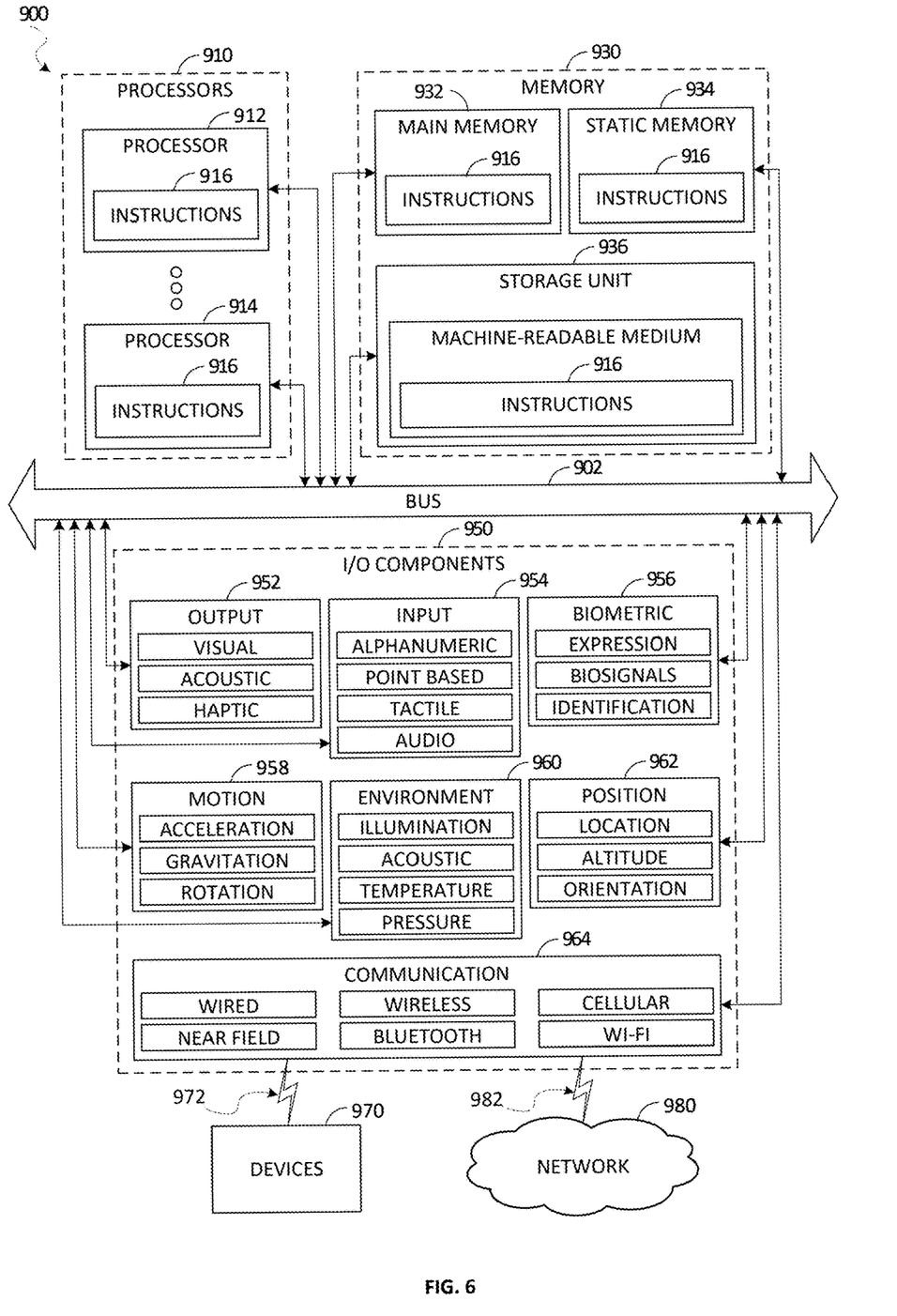
FIG. 6 illustrates a diagrammatic representation of a machine in the form of a computer system (e.g., a server computer) within which a set of instructions may be executed for causing the machine to perform any one or more of the methodologies discussed herein, according to an example embodiment.

FIG. 5 is a block diagram 800 illustrating a software architecture 802, which can be installed on any of a variety of computing devices to perform methods consistent with those described herein. FIG. 6 is merely a non-limiting example of a software architecture, and it will be appreciated that many other architectures can be implemented to facilitate the functionality described herein. In various embodiments, the software architecture 802 is implemented by hardware such as a machine 900 of FIG. 6 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-FiR drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOST, ANDROID™, WINDOWS® Phone, or another mobile operating system. In this example, the third-party application 866 can invoke the API calls 812 provided by the operating system 804 to facilitate functionality described herein.

FIG. 6 illustrates a diagrammatic representation of a machine 900 in the form of a computer system within which a set of instructions may be executed for causing the machine to perform any one or more of the methodologies discussed herein, according to an example embodiment. Specifically, FIG. 6 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithmic techniques described herein. Additionally, or alternatively, the instructions 916 may implement any one of the systems described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 6 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 6. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth®; components (e.g., Bluetooth® Low Energy), Wi-Fik components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode,     PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-FiR signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices: magnetic disks such as internal hard disks and removable disks: magneto-optical disks: and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (IxRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for securely synthesizing speech in a natural voice of a speaker during a communication session, the method comprising:
   during the communication session:
   generating a first voice profile for the speaker by i) obtaining a first sample of audio data from a stream of audio data received from a device of the speaker during a first time interval, the stream of audio data representing speech from the speaker, ii) generating from the sample of audio data the first voice profile for the speaker, and iii) writing the voice profile of the speaker to a memory storage device;
   processing the stream of audio data received from the device of the speaker during the first time interval by generating a first portion of a stream of audio data for communicating to a participant of the communication session, the first portion of the stream of audio data for communicating to the participant representing synthesized speech using the first voice profile of the speaker as stored in the memory storage device;
   communicating the first portion of the stream of audio data representing the synthesized speech to a device of the participant for play back;
   after the first time interval, generating a second voice profile for the speaker by (i) obtaining a second sample of audio data from the stream of audio data received from the device of the speaker during a second time interval, the stream of audio data representing speech from the speaker, (ii) generating from the second sample of audio data the second voice profile for the speaker, and (iii) writing the second voice profile of the speaker to the memory storage device such that it replaces the first voice profile;
   processing the stream of audio data received from the device of the speaker during the second time interval by generating a second portion of the stream of audio data for communicating to the participant of the communication session, the second portion of the stream of audio data for communicating to the participant representing synthesized speech using the second voice profile of the speaker as stored in the memory storage device;
   communicating the second portion of the stream of audio data representing the synthesized speech to the device of the participant for play back; and
   iteratively repeating the generating of voice profiles, processing of the stream of audio data, and communicating of portions of the stream of audio data for successive time intervals until conclusion of the communication session.

2. The computer-implemented method of claim 1, further comprising:
   responsive to detecting termination of the communication session, deleting the voice profile of the speaker from the memory storage device.

3. The computer-implemented method of claim 1, wherein writing the second voice profile of the speaker to a memory storage device comprises overwriting the first voice profile of the speaker that was previously written to the memory storage device.

4. The computer-implemented method of claim 3, wherein the communication session is facilitated by an application executing on the device of the participant, the application having a user interface for presentation on a display of the device, the method further comprising:
   prior to overwriting an instance of the voice profile of the speaker that was previously written to the memory storage device:
   comparing the voice profile of the speaker with the instance of the voice profile of the speaker previously written to the memory storage device; and
   determining, based on said comparison, a difference between the voice profile of the speaker and the instance of the voice profile of the speaker that was previously written to the memory storage device exceeds a threshold; and
   responsive to said determining, causing a visual indicator to be presented via the user interface of the application executing on the device of the participant, wherein the visual indicator indicates detection of a significant change in the voice profile of the speaker.

5. The computer-implemented method of claim 1, wherein processing the stream of audio data received from the device of the speaker during the first time interval and during the second time interval comprises:
   performing speech recognition on the stream of audio data received from the device of the speaker to generate symbolic linguistic representations of the speech in a second language that is different from a first language of the speech; and
   with a speech synthesizer, generating the first portion and the second portion of the stream of audio data for communicating to the device of the participant of the communication session using as input the symbolic linguistic representations of the speech in the second language, wherein the first portion is generated using the first voice profile and the second portion is generated using the second voice profile.

6. The computer-implemented method of claim 5, wherein the symbolic linguistic representations of the speech in the second language comprise:
   text in the second language; or
   phonetic transcriptions in the second language.

7. The computer-implemented method of claim 1, wherein obtaining a sample of audio data from a stream of audio data received from a device of the speaker comprises:
   obtaining a sample of audio data having a duration in the range of 2-10 seconds.

8. The computer-implemented method of claim 1, wherein the fixed interval is an interval with a duration in the range of 10-40 seconds.

9. A system for securely synthesizing speech in a natural voice of a speaker during a communication session, the system comprising:
   a hardware processor; and
   one or more memory storage devices, storing instructions thereon, which, when executed by the hardware processor, cause the system to perform operations comprising:
   during the communication session:
      generating a first voice profile for the speaker by i) obtaining a first sample of audio data from a stream of audio data received from a device of the speaker during a first time interval, the stream of audio data representing speech from the speaker, ii) generating from the sample of audio data the first voice profile for the speaker, and iii) writing the voice profile of the speaker to a memory storage device;
      processing the stream of audio data received from the device of the speaker during the first time interval by generating a first portion of a stream of audio data for communicating to a participant of the communication session, the first portion of the stream of audio data for communicating to the participant representing synthesized speech using the first voice profile of the speaker as stored in the memory storage device;
      communicating the first portion of the stream of audio data representing the synthesized speech to a device of the participant for play back;
      after the first time interval, generating a second voice profile for the speaker by (i) obtaining a second sample of audio data from the stream of audio data received from the device of the speaker during a second time interval, the stream of audio data representing speech from the speaker, (ii) generating from the second sample of audio data the second voice profile for the speaker, and (iii) writing the second voice profile of the speaker to the memory storage device such that it replaces the first voice profile;
      processing the stream of audio data received from the device of the speaker during the second time interval by generating a second portion of the stream of audio data for communicating to the participant of the communication session, the second portion of the stream of audio data for communicating to the participant representing synthesized speech using the second voice profile of the speaker as stored in the memory storage device;
      communicating the second portion of the stream of audio data representing the synthesized speech to the device of the participant for play back; and
      iteratively repeating the generating of voice profiles, processing of the stream of audio data, and communicating of portions of the stream of audio data for successive time intervals until conclusion of the communication session.

10. The system of claim 9, wherein the operations further comprise:
    responsive to detecting termination of the communication session, deleting the voice profile of the speaker from the memory storage device.

11. The system of claim 9, wherein writing the voice profile of the speaker to a memory storage device comprises overwriting an instance of the voice profile of the speaker that was previously written to the memory storage device.

12. The system of claim 11, wherein the communication session is facilitated by an application executing on the device of the participant, the application having a user interface for presentation on a display of the device, the operations further comprising:
    prior to overwriting an instance of the voice profile of the speaker that was previously written to the memory storage device:
    comparing the voice profile of the speaker with the instance of the voice profile of the speaker previously written to the memory storage device; and
    determining, based on said comparison, a difference between the voice profile of the speaker and the instance of the voice profile of the speaker that was previously written to the memory storage device exceeds a threshold; and
    responsive to said determining, causing a visual indicator to be presented via the user interface of the application executing on the device of the participant, wherein the visual indicator indicates detection of a significant change in the voice profile of the speaker.

13. The system of claim 9, wherein processing the stream of audio data received from the device of the speaker during the first time interval and during the second time interval comprises:
    performing speech recognition on the stream of audio data received from the device of the speaker to generate symbolic linguistic representations of the speech in a second language that is different from a first language of the speech; and
    with a speech synthesizer, generating the first portion and the second portion of the stream of audio data for communicating to the device of the participant of the communication session using as input the symbolic linguistic representations of the speech in the second language, wherein the first portion is generated using the first voice profile and the second portion is generated using the second voice profile.

14. The system of claim 13, wherein the symbolic linguistic representations of the speech in the second language comprise:
    text in the second language; or
    phonetic transcriptions in the second language.

15. The system of claim 9, wherein obtaining a sample of audio data from a stream of audio data received from a device of the speaker comprises:
    obtaining a sample of audio data having a duration in the range of 2-10 seconds.

16. The system of claim 9, wherein the fixed interval is an interval with a duration in the range of 10-40 seconds.

17. A system for securely synthesizing speech in a natural voice of a speaker during a communication session, the system comprising:

during the communication session:

means for generating a first voice profile for the speaker by i) obtaining a first sample of audio data from a stream of audio data received from a device of the speaker during a first time interval, the stream of audio data representing speech from the speaker, ii) generating from the sample of audio data the first voice profile for the speaker, and iii) writing the voice profile of the speaker to a memory storage device;

processing the stream of audio data received from the device of the speaker during the first time interval by generating a first portion of a stream of audio data for communicating to a participant of the communication session, the first portion of the stream of audio data for communicating to the participant representing synthesized speech using the first voice profile of the speaker as stored in the memory storage device;

means for communicating the first portion of the stream of audio data representing the synthesized speech to a device of the participant for play back;

means for, after the first time interval, generating a second voice profile for the speaker by (i) obtaining a second sample of audio data from the stream of audio data received from the device of the speaker during a second time interval, the stream of audio data representing speech from the speaker, (ii) generating from the second sample of audio data the second voice profile for the speaker, and (iii) writing the second voice profile of the speaker to the memory storage device such that it replaces the first voice profile;

means for processing the stream of audio data received from the device of the speaker during the second time interval by generating a second portion of the stream of audio data for communicating to the participant of the communication session, the second portion of the stream of audio data for communicating to the participant representing synthesized speech using the second voice profile of the speaker as stored in the memory storage device;

means for communicating the second portion of the stream of audio data representing the synthesized speech to the device of the participant for play back; and means for, iteratively repeating the generating of voice profiles, processing of the stream of audio data, and communicating of portions of the stream of audio data for successive time intervals until conclusion of the communication session.

18. The system of claim 17, further comprising:

means for deleting the voice profile of the speaker from the memory storage device responsive to detecting termination of the communication session.

19. The system of claim 18, wherein writing the voice second profile of the speaker to a memory storage device comprises overwriting the first voice profile of the speaker that was previously written to the memory storage device.

20. The system of claim 17, wherein the communication session is facilitated by an application executing on the device of the participant, the application having a user interface for presentation on a display of the device, the system further comprising:

prior to overwriting an instance of the voice profile of the speaker that was previously written to the memory storage device:

means for comparing the voice profile of the speaker with the instance of the voice profile of the speaker previously written to the memory storage device; and means for determining, based on said comparison, a difference between the voice profile of the speaker and the instance of the voice profile of the speaker that was previously written to the memory storage device exceeds a threshold; and responsive to said determining, means for causing a visual indicator to be presented via the user interface of the application executing on the device of the participant, wherein the visual indicator indicates detection of a significant change in the voice profile of the speaker.

* * * * *